(12) United States Patent
Eckl et al.

(10) Patent No.: US 11,078,316 B2
(45) Date of Patent: Aug. 3, 2021

(54) METHOD FOR POLYMERIZATION WITH EXTERNAL COOLING

(71) Applicant: WACKER CHEMIE AG, Munich (DE)

(72) Inventors: Bernhard Eckl, Burghausen (DE); Wilhelm Kaiser, Trostberg (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 16/753,943

(22) PCT Filed: Oct. 4, 2017

(86) PCT No.: PCT/EP2017/075161
§ 371 (c)(1),
(2) Date: Apr. 6, 2020

(87) PCT Pub. No.: WO2019/068318
PCT Pub. Date: Apr. 11, 2019

(65) Prior Publication Data
US 2020/0308326 A1    Oct. 1, 2020

(51) Int. Cl.
*C08F 218/08* (2006.01)
*C08F 24/00* (2006.01)

(52) U.S. Cl.
CPC ........ *C08F 218/08* (2013.01); *C08F 2438/00* (2013.01)

(58) Field of Classification Search
CPC .......................... C08F 218/08; C08F 2438/00

USPC .......................................................... 526/63
See application file for complete search history.

(56) References Cited

U.S. PATENT DOCUMENTS

| | | | | |
|---|---|---|---|---|
| 3,578,649 A | * | 5/1971 | Badguerahanian et al. | B01F 7/166 526/68 |
| 4,120,350 A | * | 10/1978 | Norton | F28F 19/00 165/162 |
| 4,808,262 A | * | 2/1989 | Aneja | B01D 1/221 159/47.1 |
| 6,660,814 B1 | | 12/2003 | Kröner et al. | |
| 2001/0039329 A1 | * | 11/2001 | Wepener | F28D 7/0091 528/501 |
| 2009/0200004 A1 | | 8/2009 | Johnston et al. | |
| 2011/0112218 A1 | * | 5/2011 | Weitzel | C08F 2/20 523/343 |
| 2011/0213073 A1 | | 9/2011 | Weitzel et al. | |
| 2014/0094573 A1 | * | 4/2014 | Kutschera | C04B 24/2623 526/64 |
| 2016/0167012 A1 | * | 6/2016 | Xu | F28D 7/14 585/716 |

FOREIGN PATENT DOCUMENTS

| | | |
|---|---|---|
| DE | 2339364 A1 | 2/1975 |
| DE | 102007040850 A1 | 3/2009 |
| DE | 102011005388 A1 | 9/2012 |
| EP | 0226204 B1 | 3/1993 |

(Continued)

*Primary Examiner* — Michael Bernshteyn
(74) *Attorney, Agent, or Firm* — Brooks Kushman P.C.

(57) ABSTRACT

Higher throughput in aqueous addition polymerization is made possible by use of an external shell and tube heat exchanger operated in reverse mode, with coolant flowing through the tubes and polymerization mixture flowing through the shell around the tubes.

10 Claims, 2 Drawing Sheets

(56) References Cited

FOREIGN PATENT DOCUMENTS

| | | |
|---|---|---|
| EP | 0834518 B1 | 1/2001 |
| EP | 2072540 A1 | 6/2009 |
| EP | 2106849 B2 | 2/2014 |
| EP | 3115734 A1 | 1/2017 |
| KR | 100771075 B1 | 10/2007 |
| WO | 2009021930 A1 | 2/2009 |
| WO | 2009027212 A1 | 3/2009 |

* cited by examiner

METHOD FOR POLYMERIZATION WITH EXTERNAL COOLING

CROSS REFERENCE TO RELATED APPLICATIONS

This application is the U.S. National Phase of PCT Appln. No. PCT/EP2017/075161 filed Oct. 4, 2017, the disclosure of which is incorporated in its entirety by reference herein.

BACKGROUND OF THE INVENTION

1. Field of the Invention

The invention relates to a process for preparing polymers in the form of their aqueous polymer dispersions by means of free-radically initiated polymerization in a polymerization reactor equipped with an external cooling circuit having at least one heat exchanger.

2. Description of the Related Art

Aqueous polymer dispersions are prepared by means of polymerization by a batchwise method or by continuous methods. Polymerization reactions of ethylenically unsaturated monomers give rise to a high heat of polymerization that has to be removed from the reaction via heat exchange surfaces in the case of the customary, temperature-regulated mode of operation. The maximum reaction rate and hence the productivity in the case of industrial-scale applications are often determined by the available size of the heat exchange area and its exploitation.

A disadvantage is that the large amounts of energy generated in the polymerization can be removed only inadequately by in-reactor cooling aggregates. The in-reactor cooling aggregates are generally an outer shell in which cooling medium flows around the reactor, or cooling coils mounted in the reactor interior. The result of the limited removal of heat associated with these devices is that process times are very long in some cases, and these impair the economic viability of the process. For better removal of heat and acceleration of the process, it is known that the polymerization can be conducted in such a way that the polymerizing medium is supplied to an external cooler through a circuit and thence recycled back into the reactor.

EP 0 834 518 A1 describes an apparatus for polymerization, comprising reactor and external cooling circuit having a low-shear pump and a heat exchanger with an essentially laminar flow profile. Preference is given to a spiral heat exchanger. EP 2 106 849 A1 relates to a process for emulsion polymerization, wherein the reaction mixture is cooled in an external plate heat exchanger. WO 2009/021930 A1 describes a continuous polymerization process which is conducted in a cascade having at least two heat exchangers connected in series. Heat exchangers specified as preferred are tube heat exchangers or shell and tube heat exchangers. In the process from WO 2009/027212 A1, the polymerization is conducted in a stirred tank with an external cooling circuit with a static mixer heat exchanger.

The exploitation of the heat exchange area, for a given available temperature differential, can be described by a coefficient of heat transfer for engineering purposes. An improvement in the cooling performance of a heat exchanger by means of an increase in the heat exchange area is subject to technical limits and causes high apparatus costs. Furthermore, the exploitation of the heat exchange area worsens as a result of deposits of polymer on the heat exchange surface (fouling). Especially in the case of heat exchange apparatuses operated in batchwise mode, this effect is observed from charge to charge in the case of inadequate cleaning.

The problem addressed was therefore that of improving external cooling in polymerization processes.

SUMMARY OF THE INVENTION

The invention provides a process for preparing polymers in the form of their aqueous polymer dispersions by means of free-radically initiated polymerization in a polymerization reactor equipped with an external cooling circuit having a pump and having at least one heat exchanger, characterized in that the heat exchanger installed is a shell and tube heat exchanger which is operated in such a way that the coolant is passed through the tubes of the tube aggregate and the polymerization mixture to be cooled is guided around the outside of the tubes of the tube aggregate.

DETAILED DESCRIPTION OF THE RELATED ART

Figure 1:
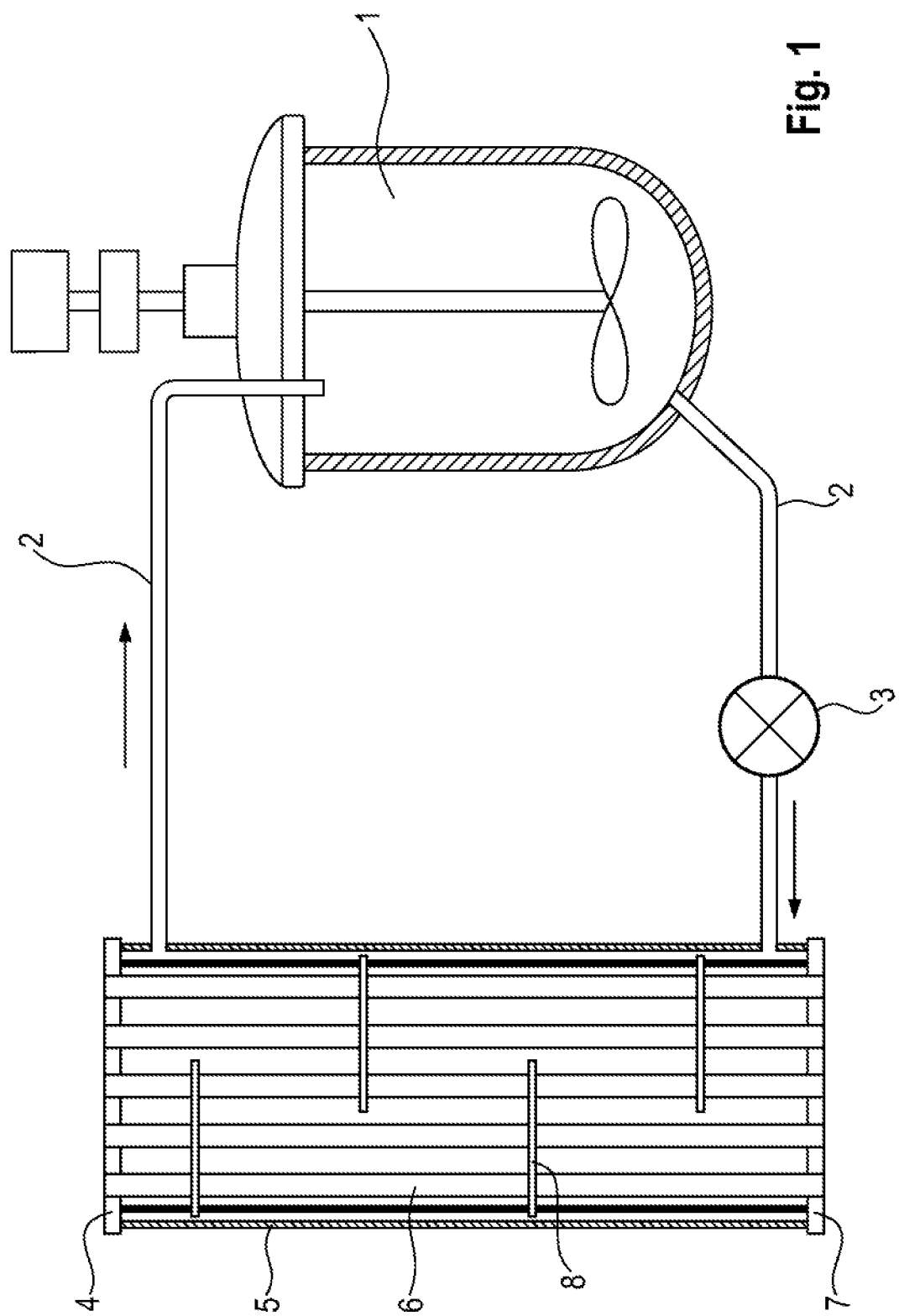
FIG. 1 shows a schematic illustration of the apparatus for performance of the process.
Figure 2:
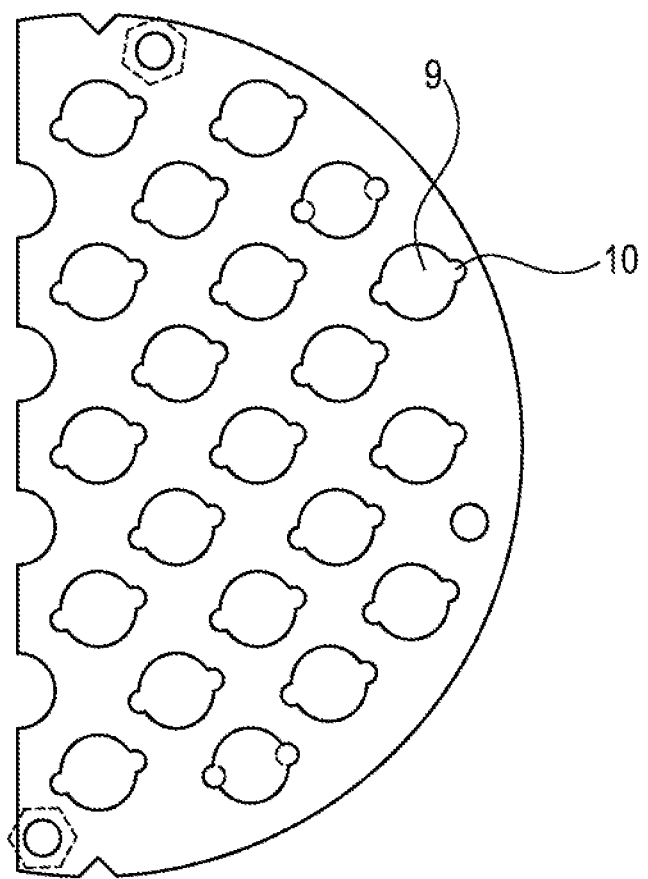
FIG. 2 shows a schematic diagram of the perforated plates that are installed as tube plates (7) or as installation (8) for holding or deflection.

Suitable polymerization reactors (1) are steel reactors of appropriate dimensions that may be designed as pressure reactors or ambient pressure reactors, and are equipped with the customary stirring equipment, heating and cooling systems, measurement and control equipment, and conduits for supply of the reactants and removal of the products.

The external cooling circuit comprises a pipeline (2) of appropriate dimensions, into which pump (3) and shell and tube heat exchanger (4) are integrated. In general, the connection to the discharge of the polymerization mixture into the external cooling circuit is in the lower third of the reactor, preferably at the base of the reactor. The connection for recycling of the polymerization mixture out of the external cooling circuit into the reactor is at a point different from the connection for discharge, generally in the upper third of the reactor, preferably at the top of the reactor.

The type of pump used is noncritical. Suitable examples are free-flow pumps (vortex) or positive displacement pumps. Preference is given to positive displacement pumps, particular preference to screw-spindle pumps. The dimensions of the pump are preferably such that it withstands a pressure of up to 100 bar, preferably 40 to 100 bar. The hourly throughput depends on the dimensions of the reactor. In general, the external cooling circuit is configured such that the flow rate (hourly throughput) is at least twice the reactor volume per hour, preferably 3 to 15 times the reactor volume per hour. Typical values are in the range from 50 to 400 m$^3$/h.

The shell and tube heat exchanger (4) is preferably manufactured from steel. It generally consists of a cylindrical vessel (5) with a parallel arrangement of a multitude of generally straight, cylindrical tubes (6) (the tube aggregate) therein. The tubes are preferably arranged such that every tube is at the same distance from each adjacent tube, called the pitch. The tubes are held at one end or each end by perforated, circular plates (7), the tube plates.

Additional perforated plates (8) of circular or part-circular, for example semicircular, configuration may be disposed between the ends of the tube aggregate, aligned transverse to the tube axis, to hold the tubes or to deflect the polymerization mixture to be cooled.

Preference is given to U-tube shell and tube heat exchangers in which the tubes are in U-shaped form, and the individual cylindrical tubes bent in a U shape are in a successive and parallel arrangement. Suitable shell and tube heat exchangers with straight tubes or tubes bent in a U shape and their dimensions and mode of operation are known to the person skilled in the art and are commercially available.

The holes (9) in the perforated plates through which the individual tubes of the tube aggregate are guided are preferably circular and extended by angular or round cutouts (10). More preferably, the circular holes (9) are extended with a round cutout in the form of a truncated circle (10).

The shell and tube heat exchanger is preferably set up vertically. In a preferred embodiment, the polymer mixture to be cooled is supplied to the lower end such that it flows around the outside of the tubes of the tube aggregate. The polymerization mixture cooled at the same time is withdrawn at the upper end and recycled into the polymerization reactor. Cooling medium, preferably water, flows through the tubes of the shell and tube heat exchanger in countercurrent or cocurrent to the polymerization mixture.

The cutouts achieve the effect of effective flow of a rinsing agent, preferably water, which is introduced at the upper end of the shell and tube heat exchanger, around the outside of the tubes in the course of cleaning. It is thus possible to prevent, or at least reduce, polymer deposition, and deposits can easily be rinsed away. This avoids, or at least drastically reduces, downtimes for cleaning of the heat exchanger.

The measure of conducting the polymerization mixture to be cooled not through the tubes but past the tubes on the outside (inverse mode) achieves a distinct improvement in exploitation of given heat exchange areas. By comparison with the conventional mode of operation, the coefficient of heat transfer is more than doubled in inverse mode. A further improvement in heat exchange results from the reduction in wall deposits which is obtained on account of more effective flushing of the outer walls of the tubes. This better flushing is obtained owing to the cutouts on the holes for receiving the tubes, which optimize the inflow and outflow of the flush liquid.

In the process for preparing polymers in the form of their aqueous polymer dispersions by means of free-radically initiated polymerization, it is possible to polymerize any desired ethylenically unsaturated monomers in aqueous medium, in the presence of any desired protective colloids and/or emulsifiers and after free-radical initiation. Ethylenically unsaturated monomers used are generally one or more monomers from the group comprising vinyl esters of unbranched or branched alkylcarboxylic acids having 1 to 15 carbon atoms, methacrylic esters and acrylic esters of alcohols having 1 to 15 carbon atoms, vinylaromatics, olefins, dienes and vinyl halides. Preference is given to using the process for polymerization of vinyl esters, preferably in the presence of ethylene, and optionally further comonomers.

Suitable vinyl esters are those of carboxylic acids having 1 to 15 carbon atoms. Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 9 to 11 carbon atoms, for example VeoVa9® or VeoVa10® (trade name of Hexion). Particular preference is given to vinyl acetate. The vinyl esters mentioned are generally polymerized in an amount of 30% to 100% by weight, preferably 30% to 90% by weight, based in each case on the total weight of the monomers.

Ethylene is generally copolymerized in an amount of 1% to 40% by weight, based on the total weight of the monomers.

Suitable further comonomers are those from the group of the esters of acrylic acid and methacrylic acid, of the vinyl halides such as vinyl chloride, and of the olefins such as propylene. Suitable methacrylic esters or acrylic esters are esters of unbranched or branched alcohols having 1 to 15 carbon atoms, such as methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate. Preference is given to methyl acrylate, methyl methacrylate, n-butyl acrylate and 2-ethylhexyl acrylate. These comonomers are optionally copolymerized in an amount of 1% to 40% by weight, based on the total weight of the monomers.

It is optionally also possible to copolymerize 0.05% to 10% by weight, based on the total weight of the monomer mixture, of auxiliary monomers. Examples of auxiliary monomers are ethylenically unsaturated mono- and dicarboxylic acids, preferably acrylic acid, methacrylic acid, fumaric acid and maleic acid; ethylenically unsaturated carboxamides and carbonitriles, preferably acrylamide and acrylonitrile; mono- and diesters of fumaric acid and maleic acid, such as the diethyl and diisopropyl esters, and maleic anhydride, ethylenically unsaturated sulfonic acids or salts thereof, preferably vinylsulfonic acid, 2-acrylamido-2-methylpropane-sulfonic acid.

Preference is given to comonomer mixtures of vinyl acetate with 1% to 40% by weight of ethylene; and comonomer mixtures of vinyl acetate with 1% to 40% by weight of ethylene and 1% to 50% by weight of one or more further comonomers from the group of vinyl esters having 1 to 15 carbon atoms in the carbonyl radical, such as vinyl propionate, vinyl laurate, vinyl esters of alpha-branched carboxylic acids having 9 to 11 carbon atoms, such as VeoVa9, VeoVa10, VeoVa11; and mixtures of vinyl acetate, 1% to 40% by weight of ethylene and preferably 1% to 60% by weight of acrylic esters of unbranched or branched alcohols having 1 to 15 carbon atoms, especially n-butyl acrylate or 2-ethylhexyl acrylate; and mixtures with 30% to 75% by weight of vinyl acetate, 1% to 30% by weight of vinyl laurate or vinyl esters of an alpha-branched carboxylic acid having 9 to 11 carbon atoms, and 1% to 30% by weight of acrylic esters of unbranched or branched alcohols having 1 to 15 carbon atoms, especially n-butyl acrylate or 2-ethylhexyl acrylate, which also contain 1% to 40% by weight of ethylene;

and mixtures with vinyl acetate, 1% to 40% by weight of ethylene and 1% to 60% by weight of vinyl chloride; where the mixtures may also contain the auxiliary monomers mentioned in the amounts mentioned, and the figures in % by weight in each case add up to 100% by weight.

The polymerization temperature is generally 40° C. to 100° C., preferably 60° C. to 90° C. The polymerization is initiated with the redox initiator combinations in common use for emulsion polymerization. Examples of suitable oxidation initiators are the sodium, potassium and ammonium salts of peroxodisulfuric acid, hydrogen peroxide, t-butyl peroxide, t-butyl hydroperoxide, potassium peroxodiphosphate, tert-butyl peroxo-pivalate, cumene hydroperoxide, isopropylbenzene monohydroperoxide, azobisisobutyronitrile. The initiators mentioned are generally used in an amount of 0.01% to 2.0% by weight, based on the total weight of the monomers. Suitable reducing agents are the sulfites and bisulfites of the alkali metals and ammonium, for example sodium sulfite, the derivatives of sulfoxylic acid, such as zinc or alkali metal formaldehydesulfoxylates, for example sodium hydroxymethanesulfinate (Brüggolit) and (iso)ascorbic acid. The amount of reducing agent is preferably 0.015% to 3% by weight, based on the total weight of the monomers.

Suitable protective colloids are fully hydrolyzed or partly hydrolyzed polyvinyl alcohols; polyvinyl acetals; polyvinylpyrrolidones; polysaccharides in water-soluble form, such as starches (amylose and amylopectin), celluloses and their carboxymethyl, methyl, hydroxyethyl, hydroxypropyl derivatives; proteins such as casein or caseinate, soya protein, gelatin; lignosulfonates; synthetic polymers such as poly(meth)acrylic acid, copolymers of (meth)acrylates with carboxy-functional comonomer units, poly(meth)acrylamide, polyvinylsulfonic acids and their water-soluble copolymers; melamine formaldehydesulfonates, naphthalene formaldehydesulfonates, styrene-maleic acid and vinyl ether-maleic acid copolymers. Preferred protective colloids are partly hydrolyzed or fully hydrolyzed polyvinyl alcohols. Preference is given to partly hydrolyzed polyvinyl alcohols having a hydrolysis level of 80 to 95 mol % and a Höppler viscosity in 4% aqueous solution of 1 to 30 mPas (Höppler method at 20° C., DIN 53015). It is also possible to use mixtures of the polyvinyl alcohols mentioned. The protective colloids mentioned are obtainable by means of methods known to the person skilled in the art. The protective colloids are generally added in the polymerization in an amount totaling 1% to 20% by weight, based on the total weight of the monomers.

Suitable emulsifiers are anionic, cationic and nonionic emulsifiers, for example anionic surfactants such as alkyl sulfates having a chain length of 8 to 18 carbon atoms, alkyl or alkylaryl ether sulfates having 8 to 18 carbon atoms in the hydrophobic radical and up to 40 ethylene oxide or propylene oxide units, alkyl- or alkylarylsulfonates having 8 to 18 carbon atoms, esters and monoesters of sulfosuccinic acid with monohydric alcohols or alkylphenols, or nonionic surfactants such as alkyl polyglycol ethers or alkylaryl polyglycol ethers having 8 to 40 ethylene oxide units. The emulsifiers are generally added in the polymerization in an amount totaling 0.5% to 5% by weight, based on the total weight of the monomers.

The monomers may be fully included in the initial reactor charge or be metered in. The procedure is preferably such that 50% to 100% by weight, especially more than 70% by weight, based on the total weight, of the monomers is included in the initial charge and the rest is metered in. The metered additions may be conducted separately (in terms of space and time), or the metered addition of all or some of the components to be metered in may be in pre-emulsified form. The protective colloid and/or emulsifier content may be fully included in the initial reactor charge or else partly metered in. The polymerization is preferably initiated with a redox system composed of oxidation component and reduction component. The monomer conversion is controlled by the metered addition of initiator.

On conclusion of the polymerization in the reactor, for removal of residual monomers, polymerization can be continued in an ambient pressure reactor employing known methods. Volatile residual monomers can also be removed by means of distillation, preferably under reduced pressure, and optionally with passage of or blanketing by inert entraining gases such as air, nitrogen or water vapor. The aqueous dispersions thus obtainable generally have a solids content of 30% to 75% by weight, preferably 50% to 60% by weight.

The examples that follow serve to further illustrate the invention:

Comparative Example 1

The apparatus for performing the polymerization comprised a pressure reactor having a capacity of about 590 liters that was equipped with a stirrer and a cooling jacket and had been connected to an external cooling circuit with a heat exchanger.

The heat exchanger installed in the cooling circuit was a U-shaped shell and tube heat exchanger with a nominal diameter of DN 250, which was equipped with 15 U-shaped tubes having a tube length of 2500 mm. The external cooling circuit was operated with an eccentric screw pump and was connected such that the polymerization mixture flowed through the U-shaped tubes, and the cooling water flowed around them.

The pressure reactor was initially charged with 120 kg of deionized water, 92 kg of a 20% solution of a polyvinyl alcohol having a hydrolysis level of 88 mol % and a Höppler viscosity of 4 mPas, and also 236 kg of vinyl acetate and 19 kg of ethylene. The pH was adjusted to 4.0 with 140 g of formic acid and the mixture, after addition of 50 ml of 10% iron ammonium sulfate, was heated up to 55° C.

On attainment of the target temperature, the metered additions of initiator were started at 750 g/h:
Oxidizing agent: 3% solution of tert-butyl hydroperoxide
Reducing agent: 5% solution of sodium hydroxymethanesulfinate (Brüggolit).

On commencement of the polymerization, the reactor contents were pumped through the external circuit at a rate of 3 m$^3$/h. At the same time, the internal temperature was controlled such that it settled at a stable 85° C.

30 minutes after the start of the reaction, another 59 kg of vinyl acetate and 29 kg of a 20% solution of a polyvinyl alcohol having a hydrolysis level of 88 mol % and a Höppler viscosity of 4 mPas were metered in within one hour. Also metered in was 15 kg of ethylene at 44 bar. After a run time of 120 minutes, the polymerization had ended and the reaction mixture was expanded in an ambient pressure reactor and excess ethylene was removed. The residual monomer level was reduced by adding 2.2 kg of 10% tert-butyl hydroperoxide and 4.4 kg of 5% sodium hydroxymethanesulfinate (Brüggolit).

This gave a dispersion having a solids content of 57.5%, a viscosity of 1480 mPas (Brookfield 20 at 23° C.), a pH of 3.4, a Tg of +16° C. and a particle diameter Dw of 1120 nm. The free residual monomer was 150 ppm.

The removal of heat via the heat exchanger in the clean state was about 34 kW. The coefficient of heat transfer was 135 W/(m K). The tube heat exchanger over the course of the period of use (50 charges) showed distinct formation of wall precipitates, with a corresponding reduction in cooling output.

Example 1

The procedure was analogous to comparative example 1, except that the external cooling circuit was connected such that the cooling water flowed through the U-shaped tubes, and the polymerization mixture was conducted past the outside of the U-shaped tubes. The heat removal output was about 73 kW. The coefficient of heat transfer was 286 W/(m K). The heat exchanger was rinsed with water between each charge. After 50 charges, no formation of wall precipitates was apparent.

The invention claimed is:

1. A process for preparing polymers in the form of their aqueous polymer dispersions by means of free-radically initiated polymerization in a polymerization reactor equipped with an external cooling circuit having a pump and having at least one heat exchanger, wherein the heat exchanger is a shell and tube heat exchanger having a tube aggregate within the shell, which is operated such that coolant is passed through tubes of the tube aggregate and the polymerization mixture to be cooled is guided around the outside of the tubes of the tube aggregate.

2. The process of claim 1, wherein the tubes of the tube aggregate are straight.

3. The process of claim 1, wherein the tubes of the tube aggregate are in U-shaped form.

4. The process of claim 1, wherein perforated plates of circular or part-circular configuration are disposed between the ends of the tube aggregate, aligned transverse to the tube axis, with holes in the perforated plates that are circular and extended by angular or round cutouts.

5. The process of claim 2, wherein perforated plates of circular or part-circular configuration are disposed between the ends of the tube aggregate, aligned transverse to the tube axis, with holes in the perforated plates that are circular and extended by angular or round cutouts.

6. The process of claim 3, wherein perforated plates of circular or part-circular configuration are disposed between the ends of the tube aggregate, aligned transverse to the tube axis, with holes in the perforated plates that are circular and extended by angular or round cutouts.

7. The process of claim 1, wherein the outside of the tubes of the tube aggregate is rinsed with a rinsing agent after each charge or after multiple charges in succession.

8. The process of claim 2, wherein the outside of the tubes of the tube aggregate is rinsed with a rinsing agent after each charge or after multiple charges in succession.

9. The process of claim 3, wherein the outside of the tubes of the tube aggregate is rinsed with a rinsing agent after each charge or after multiple charges in succession.

10. The process of claim 4, wherein the outside of the tubes of the tube aggregate is rinsed with a rinsing agent after each charge or after multiple charges in succession.

\* \* \* \* \*